(No Model.) 2 Sheets—Sheet 1.
P. S. WHITING.
LUBRICATOR.
No. 519,055. Patented May 1, 1894.
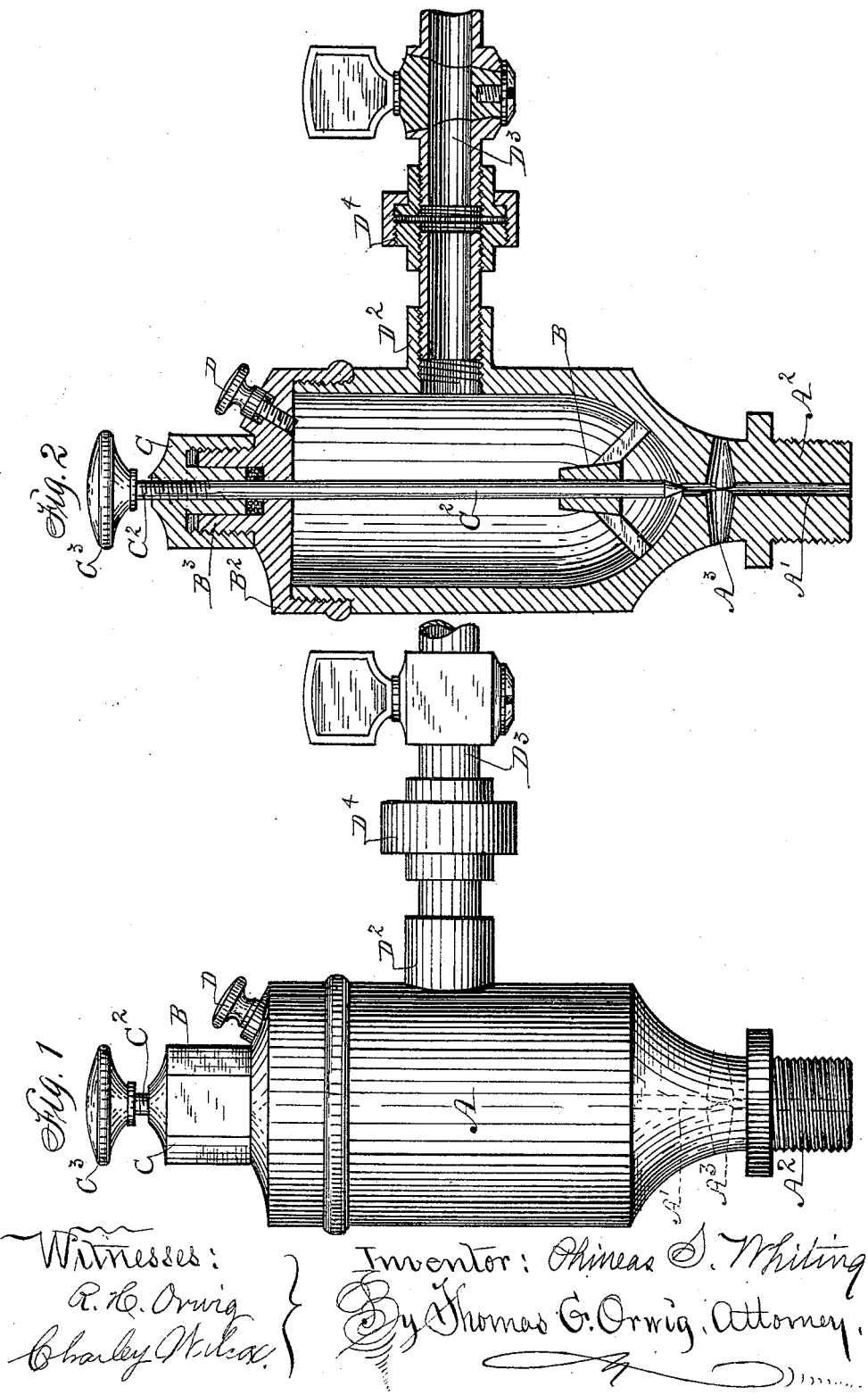

(No Model.) 2 Sheets—Sheet 2.
P. S. WHITING.
LUBRICATOR.
No. 519,055. Patented May 1, 1894.
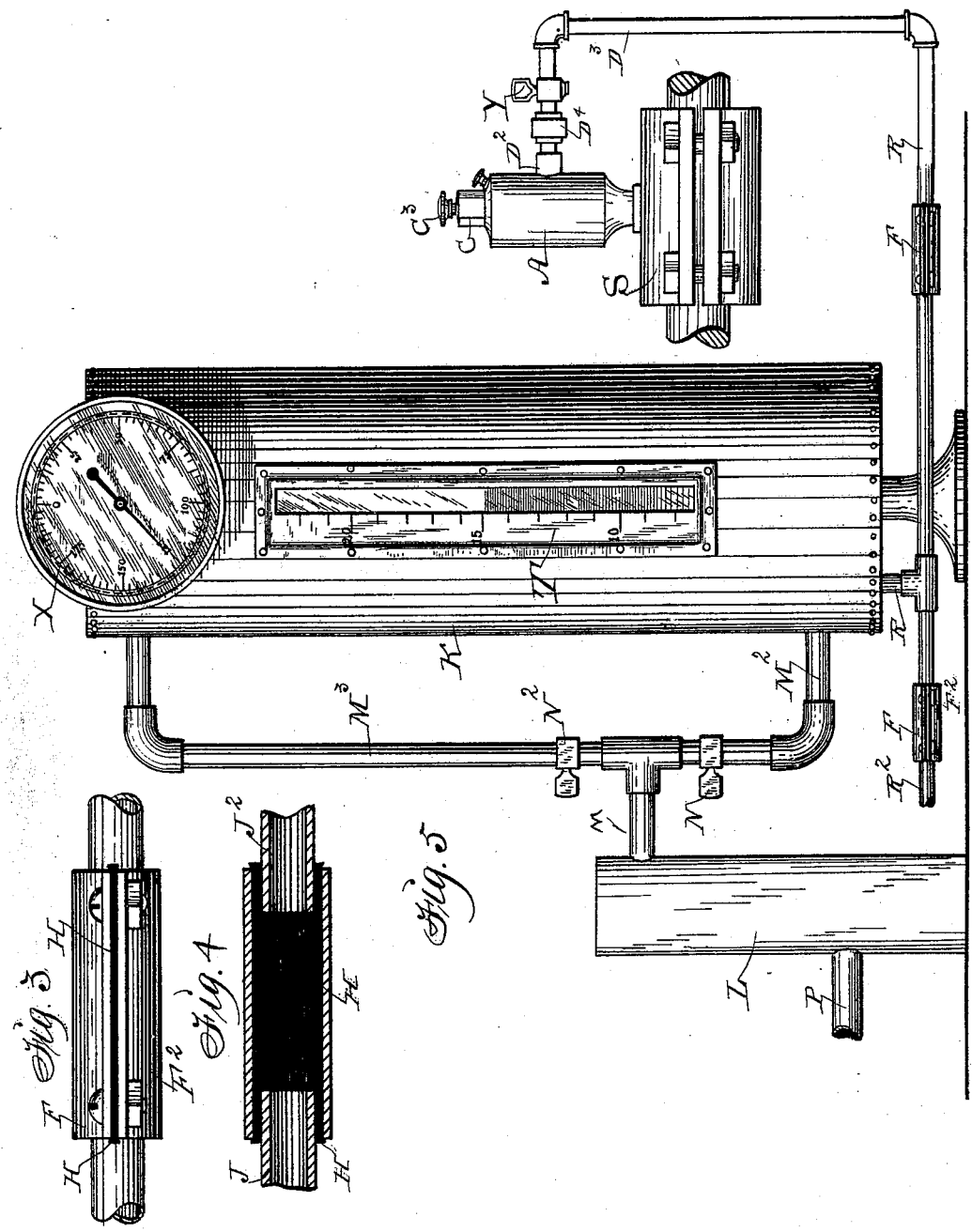

UNITED STATES PATENT OFFICE.

PHINEAS SPALDING WHITING, OF HIAWATHA, KANSAS, ASSIGNOR, BY DIRECT AND MESNE ASSIGNMENTS, TO THE WILSON & COMPANY, OF DES MOINES, IOWA.

LUBRICATOR.

SPECIFICATION forming part of Letters Patent No. 519,055, dated May 1, 1894.

Application filed December 1, 1893. Serial No. 492,551. (No model.)

*To all whom it may concern:*

Be it known that I, PHINEAS SPALDING WHITING, a citizen of the United States of America, residing at Hiawatha, in the county of Brown and State of Kansas, have invented a new and useful Apparatus for Lubricating Machinery, of which the following is a specification.

My invention consists in an oil cup and apparatus for automatically distributing oil to a plurality of oil cups and to regulate the flow of oil from a reservoir to oil cups located at different places and also to regulate the dropping of oil from each cup as hereinafter set forth, pointed out in my claim and illustrated in the accompanying drawings, in which—

Figure 1 is an outside view and Fig. 2 a sectional view of my improved oil cup specially adapted for distributing oil uniformly. Fig. 3 is an outside view and Fig. 4 is a sectional view of an insulated tube coupling adapted to prevent a current of electricity from passing through an oil distributing tube from a dynamo with which an oil cup and an oil conveying tube may be connected to the oil reservoir, or to other machines. Fig. 5 is a view of my apparatus adapted for practicing my method of distributing oil showing the relative positions in which my oil cups and insulated tube couplings and an oil reservoir and a pump may be placed as required for practical use.

In the drawings the letter A is used to designate an elongated oil cup that has a concave bottom and a bore A' extending down through an extension $A^2$ that is externally screw threaded and adapted to be attached to a journal bearing or such other portion of a machine as requires lubrication.

$A^3$ is a transverse bore in the extension $A^2$ that intersects the longitudinal bore A' and is larger at its points of intersection than at its outer ends. Air is admitted through this transverse bore to facilitate the dropping of oil through the vertical bore and also to make the drops visible so that the quantity of oil required to pass downward in a given time can be more readily regulated.

B is a bearing for a valve stem fixed in the lower portion of the cup A.

$B^2$ is a screw threaded cap fitted to and detachably attached to the top end of the cup A and has an upward tubular extension $B^3$ that is screw-threaded externally and has a bore in its center that serves as a bearing for a valve stem.

C is a gland fitted to the extension $B^3$ and provided with a screw-threaded central bore that coincides with the central bore in the cap B and $C^2$ is a valve stem that has a pointed end that is passed down through the bearing B to terminate in the top of the bore that extends downward from the concave bottom of the oil cup. A screw-thread on the top end of the stem engages the screw in the bore of the gland C in such a manner that the point on the lower end of the stem can be readily adjusted, by the rotary motion and longitudinal movement of the stem, as required to regulate the flow and dropping of oil from the oil cup. $C^3$ is a head fixed to the top end of the stem to facilitate the operation of the stem as required to adjust it in the oil cup.

D is a screw plug in a vent at the top of the cup which vent and plug are an essential feature in the operation of the complete apparatus as hereinafter set forth.

$D^2$ is an integral tube socket or branch to which an oil conveying tube $D^3$ is connected by means of a coupling $D^4$ as shown in Fig. 2, or in any suitable way.

F and $F^2$ are the mating metal parts of the insulated tube coupling and H is a piece of rubber tube adapted to be slipped on the ends of metal tube sections J and $J^2$ and clamped fast thereto by means of the mating metal parts F and $F^2$ and bolts and nuts, as illustrated by Figs. 3 and 4, in such a manner that oil can be conducted through the tube and an electric current prevented from passing from one metal section to the other.

K represents an oil reservoir and L a pump connected therewith by means of a tube M that has a branch $M^2$ entering the lower part of the reservoir to convey oil and a branch $M^3$ entering the upper part of the reservoir to convey air. The branch $M^2$ is provided with a cut off valve N and the branch $M^3$ with a valve $N^2$.

P represents a supply pipe adapted to be connected with an oil tank from which to pump oil into the reservoir K.

R is an oil conveying tube connected with the bottom of the reservoir R, and R² and R³ are branch tubes extending therefrom to oil cups A to convey oil from the reservoir K to the oil cups A.

S, in Fig. 5 represents a journal bearing to which an oil cup A is attached as required for practical use.

T represents a scale for indicating the amount of oil in the reservoir K.

X represents a pressure gage connected with the top portion of the reservoir K for determining the amount of air or compressed air force required in the top of the reservoir to regulate the distribution of oil from the reservoir to any given number of oil cups located at different points and connected with the reservoir by means of insulated tubes. Each oil conveying tube connected with an oil cup A is provided with a cut off valve Y. It is obvious that a plurality of oil cups can be thus connected with the oil reservoir and all used simultaneously or any one or any number cut off at the will of the operator.

To prepare the apparatus to act automatically in lubricating one or more bearings having oil cups connected therewith, I connect the supply pipe P with an oil tank, open the cut off valve N in the tube M² and close the valve N² in the tube M², and then operate the pump as required to force oil from the tank into the reservoir K and partially fill the reservoir. I then detach the supply tube P from the tank, close the cut off valve N in the tube M² and open the valve N² in the tube M³, open the vents at the tops of the oil cups by removing the plugs D, close the bores in the bottom of the cups by means of the valve stems C²,—and then operate the pump as required to force and compress air into the top of the reservoir K and on top of the oil therein. The power thus stored in the reservoir will press and distribute oil from the reservoir through the tubes connected therewith and with oil cups A, as shown in Fig. 5, to fill the cups with oil and expel the air therefrom. After the oil cups are thus filled with oil I close the vents at their tops, by means of the plugs D, and open the bores in their bottoms, by means of the valve stems C², as required to allow drops of oil to pass downward from the cups to the bearings with which they are connected. When the apparatus is thus put in operation its action will be automatic and require no further attention until the supply of oil in the reservoir K is extended, excepting the adjustment of the valve stems C² as may be required to regulate the dropping of oil and quantity of oil distributed from each cup in a given time as may be necessary to supply different quantities of oil to different bearings. It is obvious that when there is no air in the cups the oil cannot descend therein without creating vacuums in the cups and as long as there is a sufficient supply of oil in the reservoir K the cups will remain full. But when the supply of oil in the reservoir is diminished and the air on its top is expanded and its pressure force diminished the oil in the cups will descend from the tops of the cups and create vacuums that will cause a suction force to aid the air-pressing-force in the reservoir K to press the oil from the reservoir and through the tubes R and P and into the oil cups until the reservoir is emptied of oil. And when the reservoir is thus emptied of oil the air will follow the oil through said tubes and enter the oil cups and to press upon the oil in the cups until the cups are emptied.

The distribution of oil from the reservoir and through the oil cups to bearings can be readily observed, at any time, by looking through the bores A³ at the bottom of the oil cups and the automatic lubricating thus accomplished can be readily regulated in quantity to each bearing or cut off entirely as desired by simply adjusting the valve stem C² relative to the bores in the bottom of the cup A to which it belongs. It is obvious that by thus connecting oil cups with machinery and a reservoir and means for injecting oil and air into the reservoir and providing each oil cup with means for closing communication with the reservoir and also with means for regulating the dripping of the oil from the cups and insulating the cups, a complete apparatus is produced that will prevent waste of oil, insure safety from electric currents, and save time and labor in keeping machinery properly lubricated.

I claim as my invention—

In an apparatus for lubricating machinery the combination of the following elements, viz: a reservoir adapted to contain oil and receive and contain air under pressure for forcing said oil to the parts to be lubricated, a closed oil cup or oil cups and connections thereto from that portion of the reservoir containing the oil, said oil cup or cups each having a shank at its lower end to adapt it to be attached to the part to be lubricated, and having a longitudinal passage through said shank from said cup, and said cup having a vent and removable plug in the upper portion thereof, and a bearing for a valve stem within, the valve stem adapted to pass through an opening in the top of the oil cup and through said bearing, and to control the exit passage from said cup, substantially as described.

PHINEAS SPALDING WHITING.

Witnesses:
MORTON E. DAVIS,
THOMAS G. ORWIG.